Sept. 9, 1952    J. JANDASEK    2,609,706
HYDRODYNAMIC TRANSMISSION
Filed April 15, 1948    2 SHEETS—SHEET 1
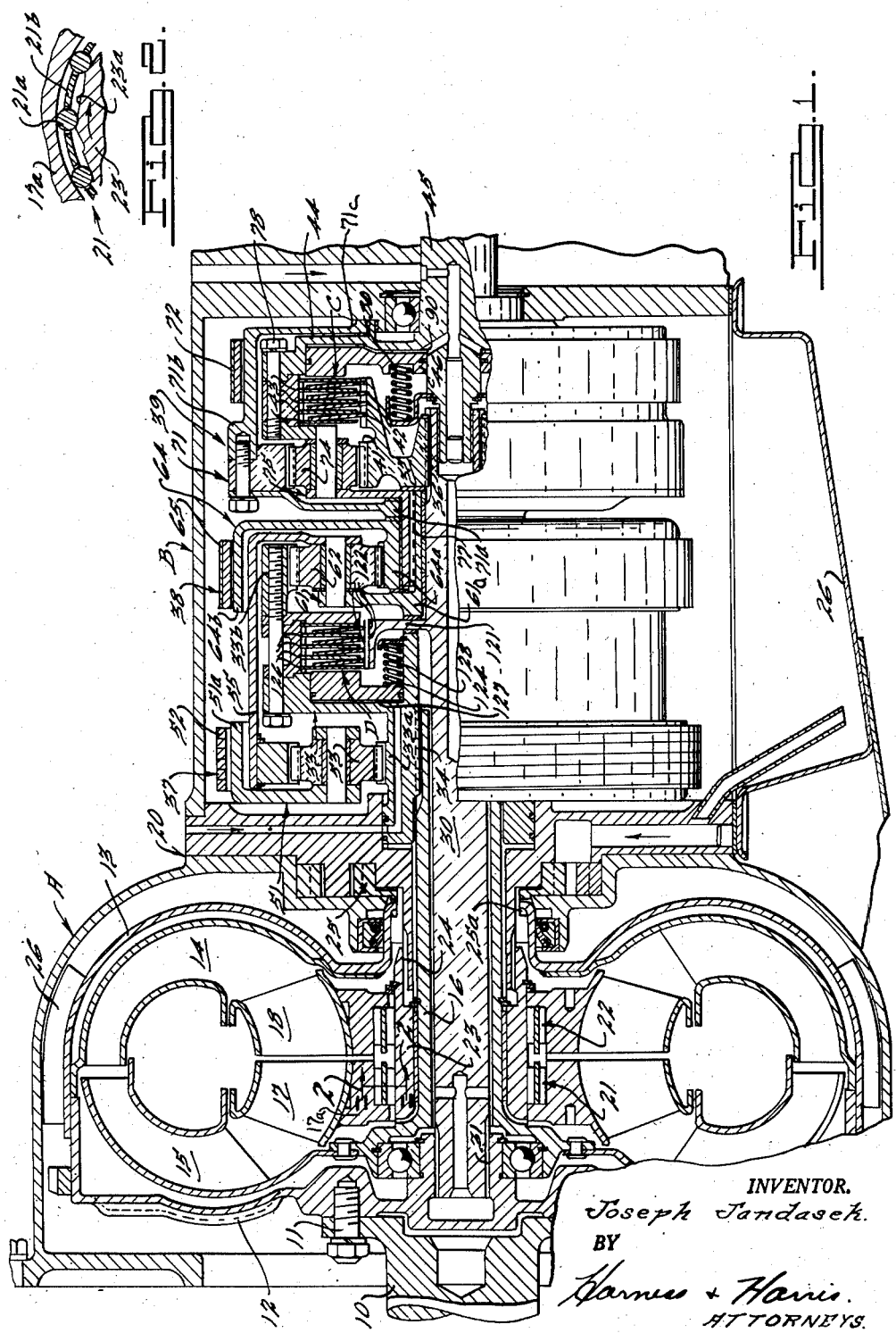
INVENTOR.
Joseph Jandasek.
BY
Harness + Harris.
ATTORNEYS.

Sept. 9, 1952 J. JANDASEK 2,609,706
HYDRODYNAMIC TRANSMISSION
Filed April 15, 1948 2 SHEETS—SHEET 2
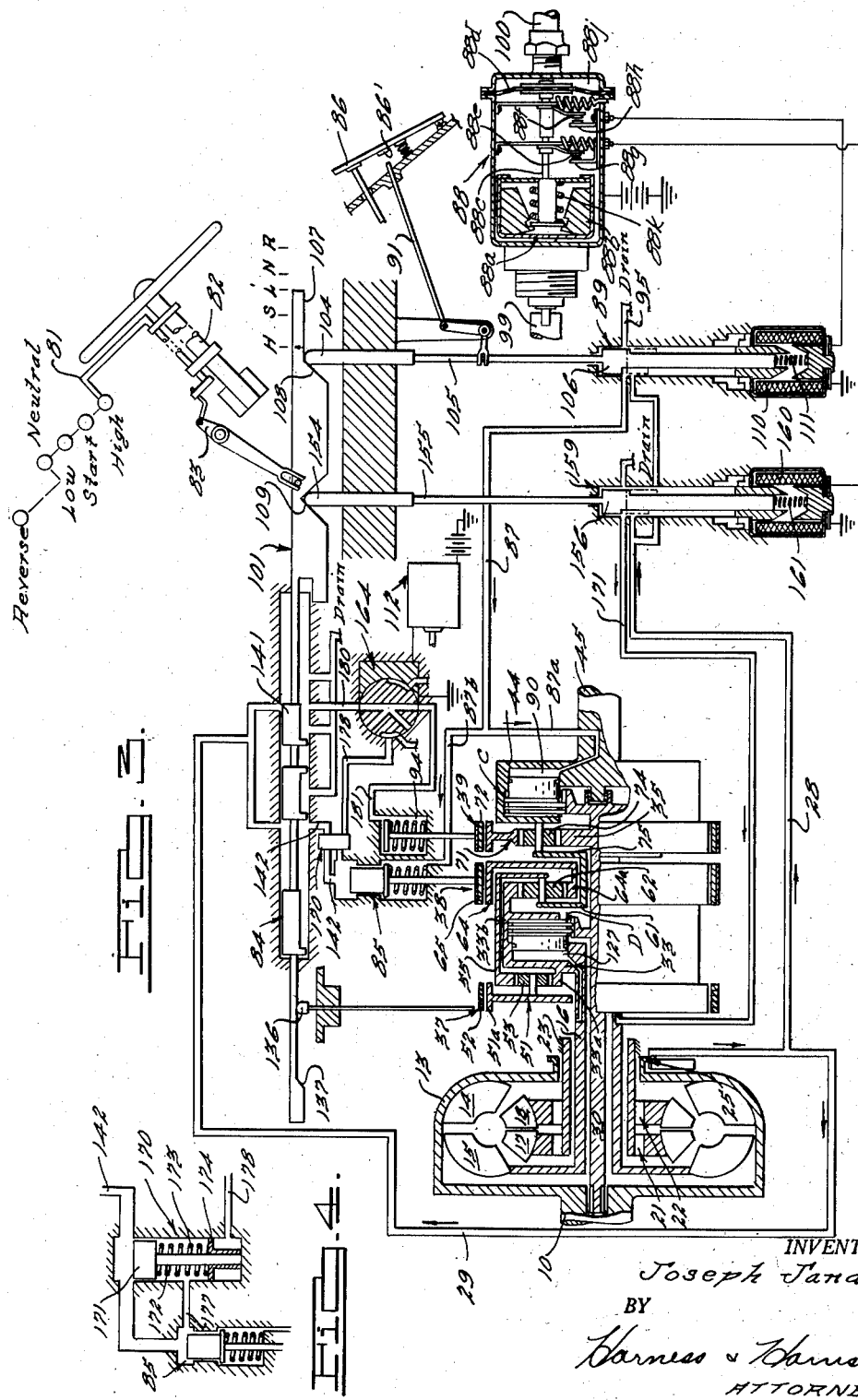
INVENTOR.
Joseph Jandasek
BY
Harness & Harness.
ATTORNEYS.

Patented Sept. 9, 1952

2,609,706

UNITED STATES PATENT OFFICE 2,609,706

HYDRODYNAMIC TRANSMISSION

Joseph Jandasek, Highland Park, Mich., assignor to Chrysler Corporation, Highland Park, Mich., a corporation of Delaware Application April 15, 1948, Serial No. 21,140

33 Claims. (Cl. 74—645)

This invention relates to hydrodynamic transmissions and refers more particularly to improvements in variable speed ratio drives for motor vehicles. While particularly adapted for motor vehicle drive, still, this invention can be used in any mechanism where it is desired to automatically vary the speed ratio drive between the driving and driven elements.

It is an object of this invention to provide a combined hydraulic and mechanical transmission that is automatic in operation, simple in design, and fully capable of providing adequate variation in speed ratio drive to efficiently and satisfactorily operate the conventional motor vehicle under all driving conditions.

More particularly my invention has to do with an improved and simplified power transmission comprising a hydraulic torque converter unit and associated mechanical gearing, so constructed and arranged as to automatically vary the speed ratio drive between the driving and the driven elements, the variations in speed ratio drive during normal drive occurring without the manual operation of a clutch pedal or any other speed ratio control means.

It is a further object of this invention to provide a motor vehicle transmission comprising a hydraulic torque converter unit and an associated variable speed gear unit wherein means are provided to initiate acceleration of the vehicle through a combined fluid and mechanical, low speed, high torque multiplying underdrive train, after which means automatically effect a lock-out of the torque converter unit and continue the accelerating drive through a completely mechanical underdrive train that is adapted to be automatically upshifted to a positive direct drive for cruising purposes. The cruising direct drive train by-passes the torque converter unit and the variable speed gear unit so as to provide a slipless, efficient, direct drive that is particularly adapted for the utilization of engine braking.

It is a further object of this invention to provide a transmission comprising a variable speed gear unit operatively associated with a hydraulic torque converter unit wherein manually activated means are provided to effect a kickdown from direct drive to a completely mechanical high speed underdrive that is particularly adapted for accelerating purposes in the cruising speed range. In addition to the manually operated means to effect the kickdown from direct drive, this transmission also includes means to effect automatic downshifts from direct drive to the starting, low speed, accelerating underdrive previously referred to.

The automatic shifting between the starting underdrive and the direct drive ratios is intended to be controlled by means responsive to vehicle speed and torque demand but other forms of governor means might be used to accomplish the automatic shifts. By virtue of the automatic shifts between the initial, low speed, accelerating, underdrive, the mechanical, high speed, underdrive and the positive direct drive, there is provided a completely automatic device for accomplishing all variations in speed ratio drive required for normal vehicle operation.

It is a further object of this invention to provide a hydrodynamic transmission having means for connecting the driving input shaft to the driven output shaft, through a completely mechanical speed reduction gear train that provides a positive drive operable as a coasting brake as well as an emergency low gear underdrive. This drive also by-passes the torque converter unit and eliminates the possibility of slip between the converter elements. It is desirable to provide control means to automatically shift this emergency low gear drive into the low speed, accelerating, underdrive when the vehicle speed and torque demand attain certain predetermined values. This shift will prevent engine stall when the vehicle is brought to rest with the drive selector positioned in the emergency low speed driving ratio.

It is a further object of this invention to supply a hydrodynamic transmission with means providing a combination fluid and mechanical, low speed, high torque multiplication underdrive for initial acceleration, which drive is adapted to be automatically shifted into a positive, high speed, mechanical underdrive when the torque multiplying effect of the hydraulic unit begins to be less effective. By reason of this shift into the positive underdrive, prior to the time the hydraulic torque converter unit begins to function as a fluid coupling, a more efficient power transmission unit is provided due to the converter unit being used only when the torque multiplying effect is most effective and most efficient. Furthermore, due to the step-by-step shifts from the initial accelerating underdrive into the cruising direct drive, there is provided a transmission unit characterized by smooth, automatic changes in speed ratio drive.

It is a further object of this invention to provide a hydrodynamic transmission of simple design that includes a combination hydraulic and mechanical, high torque multiplication, starting underdrive for low speed acceleration, a positive, mechanical, high speed underdrive that continues the initial accelerating drive after the maximum effect of the hydraulic unit has been utilized, a positive direct drive for efficient cruising drive, a manually activated, completely mechanical, high speed, accelerating underdrive adapted to provide means to kickdown from direct drive, a positive, mechanical emergency underdrive adapted to provide a coasting brake, and a reverse drive.

It is a further object of this invention to provide a hydrodynamic transmission with a simplified, highly flexible control system that does not require a manually operated friction clutch or the like.

It is a further object of this invention to provide a novel control system for this transmission wherein manually operated drive selector means overrule the automatic speed ratio control means so as to provide means which will retain the transmission in any selected gear ratio.

It is a further object of this invention to provide an improved, simplified, hydrodynamic transmission that is particularly adapted for the utilization of turbo-braking. Turbo-braking in this construction is primarily designed to assist or supplement the engine braking available through the emergency low gear drive train.

Other objects and advantages of this invention will be apparent from a consideration of the attached specification and related drawings wherein:

Fig. 1 is a sectional elevation view showing my power transmission which embodies a torque converter in combination with a planetary gear type change speed unit;

Fig. 2 is a fragmentary sectional elevational view taken along the line 2—2 of Fig. 1 disclosing the type of one-way or overrunning brake construction used between the converter guide wheels and the transmission housing;

Fig. 3 is a diagrammatic view of the transmission and a control system therefor, the transmission being shown conditioned for the transmission of direct drive; and Fig. 4 is a fragmentary sectional elevational view of the by-pass control valve for effecting the automatic shifts between the emergency low gear drive and the starting underdrive.

The drawings disclose a hydrodynamic transmission which is mounted in a housing 20 and comprises a torque converter unit A and a mechanical change speed unit B. The reference numeral 10 represents an end portion of a power driven shaft, such as the engine crankshaft of a motor vehicle, this shaft 10 being connected at 11 to the flywheel 12. The flywheel 12 carries the torque converter casing 13 within which are mounted the converter components, namely, the impeller member 14, the turbine member 15, and the primary and secondary guide members or reaction wheels 17 and 18 respectively. The vaned impeller member 14 is fixedly connected to the converter casing 13 and is accordingly rotatably driven by the driving shaft 10. The vaned turbine member 15 is drivingly connected to the forward end portion of a hollow shaft member 16 which shaft member is journalled on the intermediate shaft 30, subsequently described in detail. Primary and secondary guide wheels 17 and 18 are connected to the transmission housing 20 through freewheeling or one-way brakes 21 and 22 respectively.

As clearly shown in Fig. 2, the one-way brake construction 21 comprises rollers 21a mounted within a cage member 21b. The cage member 21b is normally urged into drive transmitting position by means of a tension spring (not shown). Cam surfaces 23a formed on the peripheral surface of the housing sleeve member 23 cooperate with the brake rollers 21a and guide wheel hub portion 17a to permit one-way rotation of the guide wheel 17. The sleeve member 23 is splined to the transmission housing at 24. The one-way brake connections between the guide wheels 17 and 18 and transmission housing 20 permit the guide wheels to be rotated forwardly by the impeller 14 but prevent rotation of the guide wheels in a reverse rotational direction. The guide wheels 17 and 18 connected to the transmission housing 20 through the one-way brake connections provide the reaction means for the converter unit. By using a plurality of guide wheels, connected to the transmission housing through separate one-way brakes, the efficiency of the converter unit is improved, this feature being clearly explained in the patent to A. Coates, No. 1,760,480, dated May 27, 1930.

A gear type oil pump 25 has a driving gear flange portion 25a which is directly connected to, and driven by, the rotatable converter casing 13. This pump 25 draws oil from the sump in oil pan 26 and circulates it through the converter unit. This pump also provides pressure fluid for lubricating purposes as well as for the various hydraulically operated control mechanisms associated with this transmission. The circulation of oil through the converter, by the engine driven pump 25, provides a means for maintaining the converter full of oil whenever the engine is running, and, furthermore, this circulation of fluid through the converter and lubrication system provides a means for cooling the converter fluid. To further assist in the cooling of the converter fluid, fins 26 are provided on the exterior surface of the converter casing 13 so as to circulate air about the converter casing and thereby reduce the temperature of the fluid within the converter casing.

The aforementioned intermediate shaft 30 has its forward end portion supported by and connected to the crankshaft 10, the splined connection between these members being indicated by the numeral 31. The rear end portion of shaft 30 encircles and is journalled on the forward end portion of the driven output shaft 45. Rotatably mounted on the rear portion of intermediate shaft 30 are three planetary gear trains indicated by the numerals 37, 38, and 39 respectively. The forward gear train 37 provides means for obtaining reverse drive through the transmission. The intermediate gear train 38, in combination with the torque converter unit, provides means for obtaining a combination fluid and mechanical, high torque multiplying, low speed, accelerating underdrive adapted for initial acceleration. This gear train 38, in combination with lock-up clutch D, also provides a means for obtaining a positive, high speed underdrive which is adapted to be automatically upshifted to direct drive. This same gear train provides a gear ratio for kickdown from the cruising direct drive to a fully mechanical, high speed, underdrive ratio adapted for accelerating purposes in the cruising speed range. The rear gear train 39 provides a coasting gear for engine braking purposes as well as a means for obtaining an emergency low speed underdrive through the transmission.

The rear end portion of intermediate shaft 30 has annular member 35 splined thereto as indicated at 36. Member 35 is formed with gear teeth 41 which constitute the sun gear element of the rear planetary gear train 39. Mounted on the rear portion of member 35 are friction clutch elements 42, of direct drive clutch C, which elements are adapted to be engaged with cooperating clutch elements 43 carried by the drum-shaped extension 44 of the output shaft 45. Engagement of clutch elements 42 and 43 is effected through a hydraulically actuated piston member 46. When clutch elements 42 and 43 are engaged a direct drive is transmitted directly from the engine crankshaft 10 through intermediate shaft 30, clutch elements 42 and 43 and drum member 44 to the output shaft 45. When the engine is connected to the output shaft through this drive train, the transmission is conditioned for the normal, forward, cruising, direct drive. This drive provides slipless engine braking for the drive train by by-passing the torque converter unit A and the planetary gear trains of the change speed unit B.

Planetary gear train 37 includes planet carrier 51 which is formed with an axially extending peripheral drum portion 51a adapted to be engaged by the braking band 52. Rotatably mounted on carrier 51 are a plurality of planet pinions 53. The teeth of pinions 53 mesh with the external teeth on the enlarged hub portion 33a of annular member 33. The annular member 33 has its hub portion 33a drivingly connected by splines 34 to the rearwardly projecting end portion of the turbine driven hollow shaft 16. The toothed portion 33a of annular member 33 constitutes the sun gear of the forward planetary gear train. The teeth of pinion 53 are also in meshing engagement with the internal teeth on drum member 55. Drum member 55 constitutes the annulus gear of the forward planetary gear train 37. The drum member 55, while forming a part of the forward planetary gear train 37 is supported by and forms a part of the planet carrier 61 of the intermediate planetary gear train 38.

Planetary gear train 38 includes the planet carrier 61 which is rotatably supported on the intermediate shaft 30 by means of hub portion 61a. Planet pinions 62, rotatably mounted on carrier 61, have teeth meshingly engaged with internal teeth on the rearwardly projecting drum portion 33b of annular member 33. This internally toothed portion 33b of member 33 forms the annulus gear of the intermediate planetary gear train 38. The teeth of pinions 62 also engage external teeth on the hub portion 64a of the rotatably supported drum member 64. Drum member 64 is rotatably supported on hub portion 61a of planet carrier member 61. The toothed hub portion 64a of drum 64 constitutes the sun gear of the intermediate planetary 38. Drum 64 has an axially extending peripheral flange 64b adapted to be engaged by the braking band 65.

Rear planetary gear train 39 includes the drum-like annulus member 71 which is rotatably supported by the radially extending wall portions 71a and 71c on the hub portion 61a of planet carrier 61 and the output shaft drum member 44 respectively. Annulus member 71 has an axially extending peripheral flange portion 71b adapted to be engaged by a braking band 72. Flange portion 71b carries internal teeth adapted to mesh with the teeth of planet pinions 74. The teeth of planet pinions 74 are also in meshing engagement with the sun gear teeth 41 on the annular member 35 that is mounted on the rear end portion of engine driven intermediate shaft 30. Planet pinions 74 are rotatably mounted on the planet carrier 75 which is supported by and connected to the hub portion 61a of planet carrier 61 by means of the spline connection 77. Planet carrier 75 is also connected by bolts 78 to the drum-shaped extension 44 of output shaft 45.

The direct drive clutch C includes the hydraulically actuated piston 46, which is adapted to be moved forwardly in cylinder 90 to effect engagement of the friction clutch plates 42 and 43. Piston 46 is normally held in a retracted, disengaged position by means of compression springs 80. However, when the transmission is to be conditioned for the transmission of direct drive from the engine crankshaft 10 to the output shaft 45, then pressure fluid is admitted to the cylinder 90, between the head of piston 46 and the inner wall of drum member 44, and this moves piston 46 forwardly to compress springs 80 and engage the clutch discs 42 and 43. Engagement of the direct drive friction clutch elements 42 and 43 occurs only after all planetary gear braking bands have been retracted to disengaged positions.

To provide means for the transmission of a completely mechanical, high speed, underdrive, a torque converter lock-up clutch mechanism D is associated with the intermediate planetary gear train 38. This lock-up clutch construction comprises the drum-like extension or spider 121, formed on shaft 30, which extension is adapted to drivingly support the friction clutch discs 122. Intermedite planetary annular member 33 has wall portions which form a cylinder 127 within which a pressure fluid actuated piston 124 is adapted to be reciprocated. Drivingly mounted on the axially extending portion 33b of annular member 33, are friction clutch discs 126 which are adapted to be engaged with the clutch discs 122 when piston 124 is moved rearwardly by the admission of pressure fluid into cylinder 127. Piston 124 is normally held in a forward, deactivated position by means of compression springs 128. Clutch D is engaged by admitting pressure fluid to the cylinder 127 and this shifts piston 124 rearwardly so as to engage clutch discs 122 and 126 and connect shafts 16 and 30 to thereby lock-up the impeller and turbine members of the torque converter A. Locking up the torque converter driving and driven elements in effect shifts the input drive for planetary gear train 38 from the turbine driven shaft 16 to the engine driven intermediate shaft 30 and thereby by-passes the torque converter unit. Upon engagement of clutch D drive is transmitted from driving shaft 10 to intermediate shaft 30, then through engaged clutch discs 122 and 126 to the internal teeth on the flange portion 33b of annular member 33. These internal teeth on member 33b constitute an annulus gear and drive the planetary pinions 62 of the intermediate planetary gear train 38. Due to braking band 65 being applied to drum 64, whenever drive is through planetary train 38, the sun gear 64a is fixed and the driven planet pinions 62 drive the planet carriers 61 and 75 to thereby transmit a positive, high speed, underdrive through drum 44 to output shaft 45. It will be noted that with the intermediate planetary sun gear 64a held against rotation by braking band 65, and annulus gear member 33b rotatably driven by the intermediate shaft 30 as a result of the torque converter lock-up, a completely mechanical, positive, underdrive is transmitted to the output shaft 45.

With drive selector lever 81 (see Fig. 3) positioned in "Neutral," the control system is so designed that the braking bands of the three planetary gear trains 37, 38 and 39 are all held in disengaged positions and the direct drive clutch C and torque converter lock-up clutch D are both maintained in a disengaged condition. Accordingly, drive cannot be transmitted from the engine crankshaft 10 to the output shaft 45. The control system shown in Fig. 3 is so arranged that whenever any one planetary braking band is applied, then the other bands are released, except when it is desired to manually apply an additional band in order to obtain turbo-braking to assist the low gear coasting brake, as will be subsequently explained.

Operation of this transmission is as follows:

For ordinary forward drive the drive selector lever 81, normally mounted on a steering column 82, is moved from the "Neutral" position to the position indicated as "High." This causes linkage 83 to actuate the shift rail member 101 and shift the plunger 141 of the manual control valve 84 to a position whereby pressure fluid from the pump 25 is directed via conduits 29 and 142, into the upper portion of the intermediate planetary brake band cylinder 85. The admission of pressure fluid into the upper portion of cylinder 85 depresses the piston in the cylinder and locks brake band 65 about the drum member 64 to thereby anchor sun gear member 64a against rotation. Anchoring gear 64a against rotation activates gear train 38. Whenever the vehicle is at a standstill, or during initial acceleration, speed and torque conditions are such that the speed and torque responsive governor means 88, subsequently described in detail, effects energization of each of the solenoids 110 and 160 that operate the control valves 89 and 159 respectively. Energization of these solenoids retracts the spring-pressed valve plungers 106 and 156 to positions that close the control valves 89 and 159. The closing of valves 89 and 159 prevents the admission of pressure fluid to either of the clutch mechanisms C or D. As a result of the activation of intermediate gear train 38 by the application of brake band 65 and the disengagement of both clutch mechanisms C and D, due to the energization of solenoids 110 and 160 respectively, the transmission unit is conditioned for the transmission of a combination hydraulic and mechanical, low speed, high torque multiplying underdrive.

As the engine throttle control member 86 is subsequently depressed to speed up the engine, the speed of rotation of the converter impeller 14 is increased and a torque multiplying drive is transmitted through the torque converter unit to the turbine-driven, hollow shaft member 16 and then to the planetary annular member 33b of gear train 38. As member 33b rotates the planet pinions 62 of the intermediate planetary gear train 38 are rotated about the fixed sun gear 64a and this causes planet carrier 61 to be rotatably driven at an underdrive ratio. As planet carrier 61 is drivingly connected to the planet carrier member 75 of the rear planetary train 39 and to the output shaft drum member 44, a combination hydraulic and mechanical, high torque multiplying, low speed underdrive, particularly adapted for initial vehicle acceleration, is transmitted from the engine crankshaft 10 through the converter unit A and planetary gearing B to the output shaft 45. It will be noted that this low speed, accelerating, underdrive is a combination fluid and mechanical torque multiplying drive for the torque multiplying effect of the converter unit is amplified by the torque multiplying effect of the intermediate planetary gear train 38 and the product of these two torque multiplications is transmitted to the output shaft 45 to provide the necessary accelerating power for the starting low speed drive.

On initial acceleration through the above-described low speed underdrive gear train, the converter impeller 14 is rotated in a counterclockwise direction by engine crankshaft 10. The shaping of the blades of the impeller, turbine and guide wheels of the converter unit is such that counterclockwise rotation of impeller 14 directs the converter fluid against the blades of the guide wheels 17 and 18 in such a manner as to tend to rotate the guide wheels in a reverse or clockwise direction. Due to the one-way brakes, 21 and 22, between the guide wheels and the sleeve extension 23 of the transmission housing 20, the guide wheels are locked-up against reverse rotation and a reaction effect is produced which multiplies the torque transmitted by the converter unit. This torque multiplication provides the accelerating power necessary for the starting drive of a motor vehicle. During the major portion of this torque multiplication period the guide wheels 17 and 18 are locked-up by the brakes 21 and 22 in a substantially stationary condition. As vehicle speed increases and the torque demand begins to decrease, the speeds of the converter impeller 14 and the runner 15 tend to attain substantially the same value. As the speeds of these members begin to approach the same value, the reaction forces directed against the guide wheel blades gradually disappear and the impelled fluid within the converter begins to drive the guide wheels forwardly in a counterclockwise direction. The forward drive of the guide wheels is a step-by-step process as first one guide wheel will be picked up by the impelled converter fluid and rotated forwardly and subsequently the other guide wheel will be picked up by the converter fluid and rotated forwardly. The use of a plurality of converter guide wheels improves the efficiency and operating characteristics of the converter unit.

If the accelerating drive was continued through the above described starting drive train, eventually the impeller, turbine and guide wheels would all be rotating in the same direction at substantially the same speed and the converter unit would be functioning as a simple fluid coupling. However, due to the fact that the torque multiplying effect of the converter unit decreases rapidly with increase in speed of the driven turbine member 15 and also due to the fact that the efficiency of the converter unit drops off at high speed, this transmission provides means adapted to automatically effect engagement of the torque converter lock-up clutch D, after the torque multiplying effect of the converter unit has been most advantageously utilized, but prior to the time the converter unit would begin to function as a simple fluid coupling, so that thereafter the accelerating underdrive is transmitted directly from the input shaft 10, via shaft 30, to the input annulus member 33b of the planetary gear train 38. With the converter unit locked out of the drive train by the engagement of clutch D, the second step of the accelerating underdrive is then transmitted through a high speed, completely mechanical, underdrive train. This latter drive is adapted to be automatically upshifted into direct drive, when the speed and torque conditions attain predetermined values, as will be subsequently described.

Normally when the vehicle speed in the starting, low speed, high torque multiplication underdrive reaches a value of between 20 to 25 miles per hour, the torque multiplying effect, as well as the efficiency of the torque converter unit will have been reduced to a point where it is desirable to lock-up the torque converter unit and continue the acceleration of the vehicle through the positive, high speed, underdrive. This automatic shift from the starting, low speed underdrive into the positive high speed underdrive is effected through the speed and torque responsive governor means 88, substantially described in detail, which controls energization of both automatic control valves 89 and 159. At the speed and torque condition when it is desirable to shift from the low speed to the high speed underdrive the governor means 88 causes a de-energization of the solenoid 160 and this permits spring 161 to raise valve plunger 156 to an open valve position so as to allow pressure fluid to be directed from pump 25 through conduits 28 and 171 into the lock-up clutch cylinder 127. Admission of pressure fluid into cylinder 127 effects engagement of the clutch discs 122 and 126 and locks together the impeller and turbine members of the torque converter unit so that a positive underdrive, adapted for high speed acceleration, is now transmitted from input shaft 10 through intermediate shaft 30, engaged clutch D, and gear train 38 to the output shaft 45. It is obvious that, by starting acceleration through the series connected torque converter unit and accelerating underdrive gear train, to provide high torque multiplication and a smooth start, and then subsequently locking out the torque converter unit after the major benefit of the converter unit has been substantially utilized, there is provided a most efficient and satisfactory underdrive arrangement.

The acceleration of the vehicle at the higher speeds is continued through the completely mechanical, high speed, underdrive train until such a point is reached that it is desirable to effect an automatic upshift into direct drive. Somewhere between approximately 25 and 60 miles per hour the speed and torque conditions will be such that the upshift to direct drive will be advantageous. At this point the governor means 88 causes a de-energization of the solenoid 110 which then permits spring 111 to raise valve plunger 106 so as to open valve 89. Opening valve 89 directs pressure fluid from pump 25 through conduits 28, 87 and 87a into the direct drive clutch cylinder 90 so as to cause engagement of clutch C and directly connect shaft 30 to the output shaft 45 through clutch C and drum member 44. Opening valve 89 not only engages clutch C but in addition pressure fluid is directed through conduits 28, 87 and 87b into the underside of intermediate brake band piston 85 so as to effect a release of the heretofore applied brake band 65. Simultaneous engagement of the direct drive clutch C and the release of the intermediate planetary brake 65 converts the high speed, positively connected, accelerating, underdrive into a direct drive from the crankshaft 10 to the output shaft 45. Direct drive is now transmitted by the drive train consisting of the crankshaft 10, the intermediate shaft 30, engaged clutch C, drum member 44, and output shaft 45.

If while operating in direct drive, the vehicle speed is substantially reduced and the torque demand increased, then the speed and torque responsive governor means 88 effects energization of solenoid 110 and a closing of the direct drive clutch control valve 89. Closing of valve 89 shuts off the supply of pressure fluid to the direct drive clutch cylinder 90 and to the underside of intermediate brake band cylinder 85. Closing valve 89 also uncovers drain port 95 which then drains the pressure fluid from the underside of cylinder 85 and from the direct drive clutch cylinder 90. Draining of the pressure fluid from these cylinders disengages the direct drive clutch C and permits the pressure fluid in the upperside of the intermediate planetary brake cylinder 85 to reapply the underdrive brake band 65 to the planetary sun gear drum member 64b. As a result of this shift in drive transmitting trains, caused by the governor controlled closing of valve 89, there is effected an automatic downshift from direct drive to the high speed, accelerating, underdrive. This automatic downshift is completely controlled by the speed and torque responsive governor means 88. It will be noted that when operating in direct drive both control valves 89 and 159 are open and both clutches C and D are engaged. Drive is not transmitted through the underdrive gear train 38 because the underdrive braking band 65 is not applied therefore there is no reaction point for this gear train. By retaining the clutch D engaged during direct drive the transmission is always conditioned for the downshift to the high speed, positively connected underdrive.

If, while operating in the cruising direct drive ratio, the vehicle operator desires to rapidly accelerate the vehicle, a completely mechanical, high-speed, accelerating, underdrive is available which may be manually activated to accomplish a smooth acceleration in the cruising speed range. This high speed, accelerating, underdrive is designed to be activated at any time and is specifically intended to be brought into operation prior to the time that a reduction in vehicle speed would cause the speed and torque responsive governor means 88 to automatically effect a downshift from direct drive to the high speed, accelerating, underdrive previously described. To effect the kickdown from direct drive to the high speed, accelerating, underdrive, the vehicle operator need merely depress the throttle control member 86 to its limit whereupon the stud 86', on the throttle control pedal 86, will actuate the linkage 91 so as to cause the linkage to overrule the governor means 88 and effect a closing of the valve 89. Closing valve 89 through manual actuation of linkage 91 disengages the direct drive clutch C and reapplies the intermediate planetary gear brake band 65 to the drum 64b in the same manner as already explained with regard to the automatic closing of valve 89 by governor 88 during the automatic downshift from direct drive to the high speed, accelerating, underdrive.

This manually controlled kickdown from direct drive to the high speed accelerating underdrive is particularly advantageous in passing other motor vehicles when operating in the cruising speed range. Due to the kickdown drive train by-passing the torque converter unit there is no chance of racing the engine or creating a turbobraking effect on kickdown as might possibly result from a high speed kickdown through the torque converter unit. It is obvious that when the depressed throttle control member 86 is released to terminate the high speed, accelerating, underdrive, then spring 111 will cause an opening of valve 89 and a return to direct drive, provided the vehicle speed and torque demand are such as to condition governor 88 for such a drive. If conditions should change so that the governor means 88 causes valve 89 to remain closed, after the throttle control 86 is released to terminate the kickdown drive, then the transmission will continue to transmit drive through the high-speed, accelerating, underdrive. The upshift from the high speed, accelerating underdrive back to direct drive will occur in the normal manner under the control of the speed and torque responsive governor 88. If while operating in the high speed underdrive the output shaft speed should continue to drop and the torque demand increase, then governor 88 will close valve 159 and this will effect a downshift into the low-speed, high torque multiplying underdrive.

To obtain reverse drive through this transmission the drive selector lever 81 is moved to the position indicated as "Reverse" and this shifts rail member 101 rearwardly to a position that closes off the flow of pressure fluid through valve 84 and causes cam portion 137 of rail 101 to actuate the follower 136 so as to lock reverse band 52 about drum 51a. Braking band 52 is of the self energizing type and provides the reaction means for the reverse drive gear train 37. It is obvious that the other braking bands for the planetary gear trains 38 and 39 are in retracted, disengaged positions at this time due to the closing off of the pressure fluid supply to valve 84. Engagement of band 52 and drum 51a locks planet carrier 51 against rotation and, as the throttle control member 86 is subsequently depressed, drive is transmitted from the converter turbine member 15, through shaft member 16, to annular member 33. Rotation of member 33 forwardly rotatably drives the sun gear portion 33a of the reverse planetary unit 37 in a forward direction and this rotates planet pinions 53 in a reverse direction. Rotation of planet pinions 53 in a reverse direction on fixed planet carrier 51 causes a reverse drive to be transmitted to the annulus drum member 55. Drum member 55 is connected to the intermediate planet carrier member 61 which in turn is connected to the rear planetary carrier member 75 and the output drum member 44. Accordingly, reverse drive will be transmitted through this gear train when the reverse braking band 52 is locked about the annulus drum 51a.

The rear planetary gear train 39 provides an emergency low gear as well as a coasting gear adapted for engine braking purposes. To obtain drive through this train it is merely necessary to move the drive control lever 81 to the position indicated as "Low" and this causes valve 84 to admit pressure fluid to the rear planetary brake band cylinder 94 so as to lock brake band 72 about the drum portion 71b of annulus gear member 71. As the throttle control member 86 is subsequently depressed to increase the engine speed, the intermediate shaft 30, which is directly connected to the engine, rotatably drives the sun gear member 35 forwardly. Due to annulus gear 71 being held by band 72, the rotation of sun gear member 35 forwardly causes forward rotation of planet pinion gears 74 about the fixed annulus gear 71 and this drives the planet carrier 75 forwardly at a reduced speed ratio. As planet carrier member 75 is directly connected to the output shaft 45, through drum member 44, forward drive is now transmitted through the emergency low gear ratio. It will be noted that when drive is being transmitted through this emergency low and coasting gear train 39 that the torque converter unit A is being by-passed due to the drive being transmitted directly from crankshaft 10 through intermediate shaft 30, teeth 41 and the gear train 39 to output shaft 45. This drive eliminates the possibility of slip in the drive train which is inherent when drive is being transmitted through the converter unit. This emergency low gear drive provides a positive low speed drive particularly adapted for use as a coasting brake due to the fact that it is positively connected to the engine, through mechanical means only. This positive connection of the driven shaft 45 to the driving shaft 10 through a speed reduction gear train 39 provides engine braking adapted to serve as a coasting brake. This positive drive is also of considerable benefit when it is necessary to start the vehicle by towing for the rear wheels of the vehicle can be positively connected to the engine crankshaft so as to drive the engine during towing.

In addition to engine braking, as a means for increasing or supplementing the usual mechanical braking system, this transmission provides means for obtaining several forms of turbo-braking to further assist or supplement the mechanical braking and/or the engine braking devices. It will be noted that when operating in the emergency low gear drive, that the engine crankshaft 10 is positively connected to output shaft 45. Accordingly, the drive train for this drive bypasses the torque converter unit A and provides a means for obtaining engine braking. If turbo-braking is also desired, when operating in this gear ratio, it is merely necessary to manually apply the braking band 65 of the low speed accelerating gear train 38, or the braking band 52 of the reverse gear train 37, and this will drive the several component wheel members of the torque converter unit A at different relative speeds and create a turbo-braking effect that tends to reduce the output shaft speed. It is obvious that if the underdrive braking band 65 is applied, while operating in the emergency low gear drive or in direct driving, then the converter impeller 14 and the turbine 15 will be driven forwardly at different speeds and this creates a turbo-braking effect. If a more powerful turbo-brake is desired than that produced by the application of the underdrive brake band 65, then the reverse braking band 52 may be applied and this will rotate the turbine member 15 of the converter unit A in a direction opposite to that of the engine driven impeller member 14 and consequently a more powerful turbo-braking effect will be produced. The manual means to apply the several braking bands, so as to produce turbo-braking, may be of any conventional form and may be hydraulically, pneumatically, electrically or mechanically operated.

While turbo-braking broadly is old in the art, still, the particular application herein disclosed is thought to be novel in that it remedies one of the inherent disadvantages of this type of braking in power transmissions. Ordinarily turbo-braking is brought into operation when drive is being transmitted through the fluid converter unit. Under such circumstances there is no positive connection between the driving shaft and the driven shaft 29. The turbo-brake under such conditions has a tendency not only to brake the driven shaft, but to also stall the driving engine. With the transmission arrangement herein disclosed the turbo-brake is applied only when the driving and driven shafts are positively connected through a drive train that by-passes the converter unit. Accordingly, the turbo-brake produces a braking effect but it does not stall the engine for the driven wheels will drive the engine regardless of the reduction in speed of the converter impeller member 14 due to the reverse rotation of the converter turbine member 15.

The drive selector lever linkage 83 actuates the slidable rail member 101 which is adapted to operate the manual control valve 84. This rail member 101 also includes cam means 108 and 109 adapted to provide means to override the automatic control valves 89 and 159 and thus prevent undesired automatic shifts by the torque and speed responsive governor means 88. Rail member 101 carries a cam portion 108 adapted to be engaged by the follower end 104 of the spring-pressed valve stem 105 of control valve 89. Rail member 101 also carries a cam portion 109 adapted to be engaged by the follower end 154 of the spring-pressed valve stem 155 of control valve 159. As drive selector lever 81 is moved to the various control positions the rail 101 is horizontally reciprocated and this causes vertical reciprocatory movement of the valve stems 105 and 155 so as to properly locate the control valve plungers 106 and 156 for the selected speed ratio drives. In all positions of the selector lever 81, except "High," the control valve plungers 106 and 156 will be cammed downwardly by the rail member 101 so as to close the pressure fluid inlets to the valves 89 and 159. When valve plunger 106 is cammed downwardly to closed valve position this opens port 95 to drain the direct clutch cylinder 90 as well as the underside of the intermediate brake band cylinder 85. Likewise, in all but the "High" position of the selector lever 81, the rail member 101 will cam valve stem 155 of control valve 159 downwardly and this will maintain valve 159 closed and drain the pressure fluid from lockup clutch cylinder 127. Obviously rail member 101 prevents the automatic upshifts to direct drive at all times except when the selector lever 81 has been moved to the "High" position. By reason of the cam mechanism 108 and 109 it is possible to set the selector lever 81 in "Start" position and prevent the automatic upshift from the low speed, accelerating underdrive to the high speed underdrive when such would otherwise be accomplished by the governor means 88. When the drive selector lever 81 is placed in "High" position the cam portion 107 of the rail 101 is positioned above the valve stem follower 104 and cam portion 109 is positioned above valve stem follower 154. This permits the valve plungers 106 and 156 to be automatically raised by springs 111 and 161 when the governor means 88 causes the de-energization of solenoids 110 and 160 to accomplish the automatic upshifts to direct drive. The starting, low speed, underdrive position of valve plungers 106 and 156 are indicated by the dashed lines in Fig. 3. On initial start the energized solenoid 160 holds the valve plunger 156 down to close off valve 159. When the output shaft speed and the torque demand are suitable for the upshift to the high speed underdrive then governor 88 de-energizes solenoid 160 and spring 161 raises plunger 156 to the open valve position. With the drive selector in the "High" position the rail cam portion 107 is positioned above follower 104, which permits the valve stem 105 to be raised to the open valve position by spring 111 if the solenoid 110 is de-energized. At low vehicle speeds the governor means 88, through the energized solenoid 110, retracts the plunger 106 and holds it in the closed valve position where it blocks off the supply of pressure fluid to conduit 87. When vehicle speed and torque demand are such that the upshift to direct drive is in order, then governor means 88 causes a deenergization of the solenoid 110 and the compressed spring 111 then forces the plunger valve 106 upwardly to the open valve position so as to direct pressure fluid through the conduit 87 to the direct drive clutch C and the underside of the underdrive brake band cylinder 85.

The speed and torque responsive governor 88 is a double contact device that closes separate electrical circuits under different conditions of output shaft speed and torque demand. The shaft 99 of the governor 88 is intended to be connected to the output shaft 45 or to some output shaft driven member and the inlet connection 100 is adapted to connect a diaphragm walled chamber 88j within the governor 88 to a torque responsive pressure unit such as the engine intake manifold or some similar mechanism. Mounted within the left end of governor 88 and drivingly connected to the driven shaft 99 is a rotatable speed responsive governor unit 88a having weights 88b that are adapted to be actuated by centrifugal force. Actuation of weights 88b causes reciprocation of the shaft 88c. Mounted on the left end of shaft 88c is a diaphragm 88d that causes the torque responsive intake manifold pressure in the chamber 88j at the left end of the governor 88 to also cause reciprocation of the shaft 88c. Shaft 88c carries a pair of switch contacts 88e and 88f respectively, which are engageable with mating switch contacts 88g and 88h respectively so as to provide two separate electrical circuits through the governor control 88. The contacts 88h and 88g are mounted on resilient spring strips for a purpose that will become readily apparent. The contacts 88f and 88h are spaced more closely than the contacts 88e and 88g. Overcenter compression springs are associated with each of the sets of electrical contacts to effect snap action thereof.

Operation of the governor control 88 is as follows:

At closed throttle with the transmission set for the normal accelerating underdrive through gear train 38 the governor weights 88b will not be rotating and the spring 88k of governor unit 88a will overcome the manifold vacuum in the chamber 88j at the right end of the governor 88 and urge the saft 88c towards the left so that both sets of electrical contacts will be closed. Because of the spring strip supports for contacts 88g and 88h it is possible to engage the more widely spaced contacts 88e and 88g after engagement of the more closely spaced contacts 88f and 88h. As vehicle speed increases and the torque load decreases conditions will be such as to permit the control 88 to cause a shift of the shaft 88c towards the right. After a predetermined amount of rightward shift of shaft 88c, the more widely spaced contacts 88e and 88g will first be opened to cause de-energization of solenoid 160 and opening of valve 159 to effect engagement of clutch D. This opening of valve 159 upshifts the transmission from the low speed fluid and mechanical torque multiplying underdrive into the positively connected, high speed underdrive. Subsequent shift of the shaft 88c towards the right an additional amount, due to increased output shaft speed and reduced torque load, will thereafter bring about an opening of the switch contacts 88f and 88h which will cause de-energization of the solenoid 110 which opens the valve 89 and effects engagement of clutch C and disengagement of planetary brake band 65. The drive train rearrangement resulting from this change upshifts the transmission from the high speed underdrive to the positively connected direct drive. It is obvious that other forms of controls could be used to transmit the varying speed and torque conditions to the automatic control valves and thus accomplish the automatic shifts previously described in detail.

When operating in direct drive, with plunger valve 106 in the raised, open valve position, it is obvious that a depression of the foot throttle control member 86 to its lower limit will cause linkage 91 to move the valve member 106 to the closed valve position and thus overrule the governor control means 88. Valve plunger 106 may be moved to closed valve position even though solenoid 110 is deenergized for the spring 111 is merely compressed by the downward movement of the valve plunger assembly 104—106.

A governor means 112 is provided to operate an electrically controlled by-pass valve 164 so as to automatically shift the transmission of drive from the emergency low gear train 39 to the starting underdrive gear train 38 when the vehicle speed drops below a minimum speed of approximately 2 or 3 miles per hour. This governor controlled shift prevents stall of the engine at low vehicle speeds when the selector lever is positioned in the low gear emergency drive for the direct connection between the engine and output shaft in emergency low gear is automatically replaced with a drive through the underdrive gear train and the torque converter unit which permits slip between the converter wheels when the vehicle is brought to rest. Also, when the vehicle is to be started through the emergency low gear train 39 the governor means 112 initiates this start through the torque converter and the low speed underdrive gear train 38 and then shifts the drive train to the low gear train 39 after the vehicle is set in motion. This start through the converter unit prevents a jerky start and provides a fluid drive in all starting gear ratios. Furthermore, when the vehicle is being brought to a stop in the emergency low gear the governor means 112 insures that the transmission is automatically shifted into the starting underdrive gear ratio wherein the slip of the torque converter wheels, at engine idling speeds, prevents creep of the vehicle.

The automatic shift from the emergency low gear drive into the starting underdrive is effected in the following manner. With the drive selector lever 81 positioned for the emergency low gear drive, control valve 84 directs pressure fluid through conduit 180, governor controlled valve 164, and conduit 181 into the emergency low gear brake band cylinder 94. Pressure fluid in cylinder 94 applies the emergency low gear brake band 72 to the drum of annulus gear 71 and this activates planetary gear train 39 for the transmission of the emergency low gear underdrive. In the event the vehicle speed drops down to approximately 2 or 3 miles per hour while the transmission is conditined for the emergency low gear underdrive, the governor means 112 will cause a clockwise rotation of the valve plug of valve unit 164 to a position that drains the cylinder 94 and directs pressure fluid from valve 84 through conduit 180 and valve 164 into conduit 178 and into the lower portion of the cylinder of by-pass control valve 170. Admission of pressure fluid into the lower portion of the cylinder in by-pass control valve 170 forces the valve plunger 171 (see Fig. 4) upwardly so that the conduit 142 is closed off between the valve 84 and the underdrive brake band cylinder 85. After conduit 142 has been closed off by valve plunger 171, the pressure fluid in the lower portion of the cylinder of by-pass control valve 170 will then compress the valve spring 173 and raise the plunger member 174 to such a position that the inlet to conduit 177 is uncovered and this will permit pressure fluid from the conduit 178 to pass through the by-pass control valve 170 and into the upper portion of underdrive brake band cylinder 85. Admission of pressure fluid into the upper portion of underdrive cylinder 85, after valve plunger 171 has closed off the passage through conduit 142, causes the application of brake band 65 to the drum of sun gear 64a and this activates the underdrive gear train 38 so that the transmission will be conditioned for the transmission of the low speed, high torque multiplication, underdrive. To accomplish this automatic shift it is necessary that the pressure fluid directed through conduit 178 to valve 170 first raise the by-pass control valve plunger 171 to close off conduit 142, before pressure fluid is admitted to the underdrive braking cylinder 85, so that the pressure fluid drain from cylinder 85 will be closed off prior to the admission of pressure fluid into the underdrive brake band cylinder 85.

I claim:

1. In a hydrodynamic transmission, an input shaft and an output shaft, a hydraulic torque converter unit comprising an impeller member, a turbine member and a reaction member, means drivingly connecting said impeller member to said input shaft, a variable speed gear unit operably connected between said shafts comprising a planetary gear train having meshingly engaged sun, pinion and annulus gears, a carrier for said pinion gears, and braking means for said sun gear, said annulus gear being drivingly connected to said turbine member and said pinion gear carrier being drivingly connected to said output shaft to provide means for the transmission of a low speed, combination hydraulic and mechanical torque multiplying, underdrive, a first clutch means adapted to directly connect said impeller and turbine members to lock said torque converter unit out of said low speed underdrive train to thereby provide means for the transmission of a positive, high speed underdrive, a second clutch means adapted to directly connect said input and output shafts for the transmission of direct drive, output shaft speed and torque responsive control means adapted to operate said clutch means to automatically upshift said low speed underdrive to said high speed underdrive and to said direct drive and to automatically downshift said direct drive back into said high speed underdrive and said low speed underdrive, and manually controlled means adapted to operate said second clutch means to overrule said speed and torque responsive means to provide means for accomplishing a kickdown from said direct drive to said high speed underdrive.

2. In a hydrodynamic transmission, an input shaft and an output shaft, a hydraulic torque converter unit comprising an impeller member, a turbine member and a reaction member, means drivingly connecting said impeller member to said input shaft, a variable speed gear unit operably connected between said shafts comprising a planetary gear train having meshingly engaged sun, pinion and annulus gears, a carrier for said pinion gears, and braking means for said sun gear, said annulus gear being drivingly connected to said turbine member and said pinion gear carrier being drivingly connected to said output shaft to provide means for the transmission of a combination hydraulic and mechanical, high torque multiplying, underdrive, a first clutch means adapted to directly connect said impeller and turbine members to lock said converter unit out of said combination hydraulic and mechanical underdrive train to thereby provide a completely mechanical underdrive train, a second clutch means adapted to directly connect said input and output shafts for the transmission of direct drive, control means adapted to operate said clutch means to automatically upshift said combination hydraulic and mechanical underdrive to said completely mechanical underdrive and to said direct drive and to automatically downshift said direct drive to said completely mechanical underdrive and to said combination hydraulic and mechanical underdrive, manually actuated means adapted to operate said second clutch means to provide means for accomplishing a kickdown from said direct drive to said completely mechanical underdrive and a second planetary gear train adapted to be positively connected between said input and output shafts to provide means for the transmission of an emergency low gear underdrive said second gear train having its sun gear driven by the input shaft, its pinion carrier for its pinion gears drivingly connected to the output shaft and its annulus gear associated with a braking means.

3. In a power transmission, an input shaft, an output shaft, a hydraulic torque converter unit, comprising impeller and turbine members, and a variable speed gear unit operatively connected in series between said shafts, said gear unit comprising a gear reduction means adapted to be driven by the turbine member of said converter unit to provide means for the transmission of a combination hydraulic and mechanical torque multiplying, low speed, underdrive from said input to said output shaft, a first clutch means adapted to directly connect the converter impeller and turbine members to lock said torque converter unit out of said low speed underdrive train and provide means for the transmission of a high speed mechanical underdrive between said shafts, a second clutch means adapted to directly connect said shafts to provide means for the transmission of direct drive between said shafts, output shaft speed and torque controlled means to operate said first and second clutch means to provide for the automatic upshifting of said low speed underdrive to said high speed underdrive and to said direct drive and to provide for the automatic downshifting of said direct drive to said high speed underdrive and said low speed underdrive, and manually actuated means adapted to operate said second clutch means and to provide means to overrule said speed and torque controlled means for accomplishing a kickdown from said direct drive to said high speed underdrive which drive is transmitted by means positively connecting said input shaft to said output shaft through said gear means.

4. In a power transmission, an input shaft, an output shaft, a hydraulic torque converter unit, comprising impeller and turbine members, and a variable speed gear unit operatively connected in series between said shafts, said gear unit comprising a first gear reduction means adapted to be driven by the turbine member of said converter unit to provide means for the transmission of a combination hydraulic and mechanical torque multiplying, low speed, underdrive from said input to said output shaft, a first clutch means adapted to directly connect the converter impeller and turbine members to lock said torque converter unit out of said low speed underdrive train and provide means for the transmission of a high speed mechanical underdrive between said shafts, a second clutch means adapted to directly connect said shafts to provide means for the transmission of direct drive between said shafts, output shaft speed and torque responsive control means to operate said first and second clutch means to provide for the automatic upshifting of said low speed underdrive to said high speed underdrive and to said direct drive and to provide for the automatic downshifting of said direct drive to said high speed underdrive and said low speed underdrive, manually controlled means adapted to operate said second clutch means and providing means to overrule said automatic control means to accomplish a kickdown from said direct drive to said high speed underdrive which drive is transmitted by means positively connecting said input shaft to said output shaft through said gear means, and a second gear reduction means adapted to be positively connected between said shafts so as to provide means for the transmission of an emergency low gear underdrive particularly adapted for use as a coasting brake.

5. In a power transmission, an input shaft, an output shaft, a hydraulic torque converter unit, comprising impeller and turbine members, and a variable speed gear unit operatively connected in series between said shafts, said gear unit comprising planetary gear means having meshingly engaged sun, pinion and annulus gears, a carrier for said pinion gears, and braking means for said sun gear, said annulus gear being arranged to be driven by the turbine member of said converter unit so as to provide means for the transmission of a combination hydraulic and mechanical, torque multiplying, low speed underdrive from said input to said output shaft, a first clutch means adapted to be engaged to directly connect said input shaft to the annulus gear of said planetary gear means so as to provide means for the transmission of a high speed, mechanical, underdrive between said shafts, a second clutch means carried by said shafts adapted to be engaged for the transmission of direct drive between said shafts, speed and torque responsive control means to operate each of the clutches to provide for an automatic upshift from said low speed underdrive to said high speed underdrive and to said direct drive and to provide for an automatic downshift from said direct drive to said high speed underdrive and said low speed underdrive, and manually controlled means to operate the second clutch to effect a kickdown from said direct drive to said high speed, mechanical underdrive, said kickdown being effected by disengagement of said second clutch, engagement of said first clutch and activation of said planetary gear means.

6. In a hydrodynamic transmission, an input shaft, an output shaft, a hydraulic torque converter unit comprising impeller, turbine and reaction members adapted to be driven by said input shaft, a variable speed gear unit comprising a first planetary gear train adapted to be drivingly connected between said shafts to provide means for the transmission of a positive, emergency low speed underdrive, a second planetary gear train adapted to be drivingly connected between said turbine wheel and said output shaft to provide means for the transmission of a combination hydraulic and mechanical, high torque multiplying, low speed underdrive, a first clutch means adapted to connect said turbine member and said input shaft, a second clutch means carried by said shafts adapted to connect said shafts to provide means for the transmission of direct drive, control means adapted to automatically activate said first clutch means to connect said impeller and turbine members and convert said hydraulically transmitted low speed underdrive into a high speed mechanical underdrive, control means adapted to automatically activate said second clutch means to convert said high speed mechanical underdrive into direct drive, and control means adapted to effect automatic downshifting from said direct drive to said high speed mechanical, underdrive and to said low speed underdrive.

7. In a hydrodynamic transmission, an input shaft, an output shaft, a hydraulic torque converter unit comprising impeller, turbine and reaction members adapted to be driven by said input shaft, a variable speed gear unit comprising a first planetary gear train adapted to be drivingly connected between said shafts to provide means for the transmission of a positive, emergency low speed underdrive, a second planetary gear train adapted to be drivingly connected between said turbine wheel and said output shaft to provide means for the transmission of a combination hydraulic and mechanical torque multiplying underdrive, a first clutch means adapted to be activated to engage the impeller and turbine members of said converter unit to convert said combination hydraulic and mechanical underdrive into a completely mechanical underdrive adapted for high speed acceleration, a second clutch means carried by said shafts adapted to be activated to connect said shafts for the transmission of direct drive, control means adapted to automatically activate said first clutch means at a first predetermined output shaft speed and torque condition, and to subsequently activate said second clutch at a second predetermined output shaft speed and torque condition, and a third planetary gear train adapted to be drivingly connected between said turbine member and said output shaft to provide means for the transmission of a reverse drive.

8. In a hydrodynamic transmission, an input shaft, an output shaft, a torque converter unit comprising impeller, turbine and reaction wheels adapted to be driven by said input shaft, a variable speed gear unit comprising a planetary gear train adapted to be drivingly connected between said turbine wheel and said output shaft to provide means for the transmission of a combination fluid and mechanical, torque multiplying, low speed underdrive therebetween, a first clutch means carried by said shafts adapted to be engaged therebetween for the transmission of direct drive, governor controlled means adapted to operate said first clutch to effect an automatic upshift from said low speed underdrive to said direct drive and to effect an automatic downshift from said direct drive to said low speed underdrive, a second clutch means associated with said converter unit and adapted to be engaged to directly connect the impeller and turbine wheels of said converter unit so as to provide means to transmit a positive drive from said input shaft to said planetary gear train, and manually controlled means to operate said first clutch adapted to provide means to effect a kickdown from said direct drive to a positive, mechanical high speed, underdrive transmitted through said second clutch and said planetary gear train.

9. In a power transmission, an input shaft, a fluid torque converter unit comprising impeller and turbine members drivingly connected to said input shaft, a second shaft connected to and adapted to be driven by the turbine member of said converter unit, first and second planetary gear trains connected to and adapted to be selectively driven by said second shaft, a third planetary gear train positively connected to said input shaft, an output shaft, means adapted to drivingly connect each of said planetary gear trains to said output shaft, means adapted to activate said first gear train so as to transmit a combination fluid and mechanical, low speed underdrive from said input to said output shaft, means adapted to activate said second gear train so as to transmit a reverse drive from said input to said output shaft, means adapted to activate said third gear train so as to transmit a positive, emergency low gear drive to said output shaft, said third gear train being adapted to serve as a coast braking drive train, a first clutch means carried by and adapted to be engaged to connect said input and output shafts for the transmission of a direct drive, governor controlled means adapted to operate said first clutch to effect an automatic upshift from said low speed underdrive to said direct drive and to effect an automatic downshift from said direct drive to said low speed underdrive, a second clutch means carried by and adapted to be engaged to directly connect said input shaft to said first planetary gear train to provide means for the transmission of a positive, high speed underdrive, and manually controlled means adapted to disengage said first clutch to effect a kickdown from said direct drive to said positive, high speed underdrive transmitted through said second clutch means and said first planetary gear train.

10. In a power transmission, an input shaft, a hydraulic torque converter unit comprising impeller and turbine members drivingly connected to said input shaft, a second shaft connected to and adapted to be driven by the turbine member of said converter unit, a first planetary gear train connected to and adapted to be driven by said second shaft, a second planetary gear train positively connected to said input shaft, an output shaft, means adapted to drivingly connect said planetary gear trains to said output shaft, means adapted to activate said first gear train so as to transmit a combination hydraulic and mechanical, torque multiplying underdrive from said input to said output shaft, a first clutch means associated with said converter members and adapted to be activated to directly connect the impeller member of said converter unit to said first gear train to convert said torque multiplying underdrive to a completely mechanical underdrive, means adapted to activate said second gear train so as to transmit a positive, emergency low gear drive from said input to said output shaft, a second clutch means mounted between said input and output shafts and adapted to be activated to connect said input and output shafts for the transmission of a direct drive, speed and torque responsive control means adapted to automatically activate said first and second clutch means successively to effect upshifts from said combination hydraulic and mechanical underdrive to said completely mechanical underdrive and to said direct drive, and to effect successive automatic downshifts from said direct drive to said mechanical underdrive and to said combination fluid and mechanical underdrive.

11. In a power transmission, an input shaft, an output shaft, a hydraulic torque converter unit comprising operatively associated impeller, turbine and reaction wheels, means providing a driving connection between said input shaft and said impeller wheel, a planetary gear train comprising an annulus gear, a sun gear and a planet carrier mounting planet gears interposed between said converter unit and said output shaft, means drivingly connecting said turbine wheel to said annulus gear, drive transmitting means connecting said planet carrier to said output shaft, braking means adapted to anchor said sun gear against rotation so as to activate said gear train and provide means for the transmission of a combination hydraulic and mechanical, high torque multiplying, underdrive to said output shaft, a first clutch means adapted to connect said input and output shafts for the transmission of a positive direct drive, and a second clutch means adapted to drivingly connect said input shaft to the annulus gear of said planetary gear train so as to lock said converter unit out of the combination hydraulic and mechanical underdrive train and provide means for the transmission of a positive, completely mechanical underdrive to said output shaft.

12. In a power transmission, an input shaft, an output shaft, a hydraulic torque converter unit comprising operatively associated impeller, turbine and reaction wheels, means providing a driving connection between said input shaft and said impeller wheel, a planetary gear train comprising an annulus gear, a sun gear and a planet carrier mounting planet gears interposed between said converter unit and said output shaft, means drivingly connecting said turbine wheel to said annulus gear, drive transmitting means connecting said planet carrier to said output shaft, braking means adapted to anchor said sun gear against rotation so as to activate said gear train and provide means for the transmission of a combination hydraulic and mechanical, high torque multiplying, underdrive to said output shaft, a first clutch means adapted to connect said input and output shafts for the transmission of a positive direct drive, and a second clutch means adapted to drivingly connect said input shaft to the annulus gear of said planetary gear train so as to lock said converter unit out of the combination hydraulic and mechanical underdrive train and provide means for the transmission of a positive, completely mechanical underdrive to said output shaft and control means adapted to effect automatic upshifting from said combination hydraulic and mechanical underdrive to said completely mechanical underdrive and to said direct drive, and to automatically downshift said direct drive to said completely mechanical underdrive and to said combination hydraulic and mechanical underdrive.

13. In a power transmission, an input shaft, an output shaft, a hydraulic torque converter unit comprising operatively associated impeller, turbine and reaction wheels, means providing a driving connection between said input shaft and said impeller wheel, a planetary gear train comprising an annulus gear, a sun gear and a planet carrier mounting planet gears interposed between said converter unit and said output shaft, means drivingly connecting said turbine wheel to said annulus gear, drive transmitting means connecting said planet carrier to said output shaft, braking means adapted to anchor said sun gear against rotation so as to activate said gear train and provide means for the transmission of a combination hydraulic and mechanical, high torque multiplying, underdrive to said output shaft, a first clutch means adapted to connect said input and output shafts for the transmission of a positive direct drive, and a second clutch means adapted to drivingly connect said input shaft to the annulus gear of said planetary gear train so as to lock said converter unit out of the combination hydraulic and mechanical underdrive train and provide means for the transmission of a positive, completely mechanical underdrive to said output shaft and control means adapted to effect automatic upshifting from said combination hydraulic and mechanical underdrive to said completely mechanical underdrive and to said direct drive, and to automatically downshift said direct drive to said completely mechanical underdrive and to said combination hydraulic and mechanical underdrive, and manually actuated means adapted to kickdown said direct drive to said completely mechanical underdrive.

14. In a power transmission, an input shaft, an output shaft, a hydraulic torque converter unit comprising operatively associated impeller, turbine and reaction wheels, means providing a driving connection between said input shaft and said impeller wheel, first and second planetary gear trains interposed between said converter unit and said output shaft, drive transmitting means connecting said turbine wheel to the annulus gear of said first planetary gear train and to the sun gear of said second planetary gear train, drive transmitting means connecting the planet carrier of said first planetary gear train and the annulus gear of said second planetary gear train to said output shaft, braking means adapted to anchor the sun gear of said first planetary gear train against rotation so as to provide means for transmitting a combination hydraulic and mechanical, low speed underdrive to said output shaft, braking means adapted to anchor the planet carrier of said second planetary gear train against rotation so as to provide means for transmitting a reverse drive to said output shaft, a first clutch means adapted to connect said input and output shafts for the transmission of direct drive, a second clutch means adapted to drivingly connect said input shaft to the annulus gear of said first planetary gear train so as to lock said converter unit out of said low speed underdrive train and provide means for the transmission of a completely mechanical, high speed, underdrive to said output shaft.

15. In a power transmission, an input shaft, an output shaft, a hydraulic torque converter unit comprising operatively associated impeller, turbine and reaction wheels, means providing a driving connection between said input shaft and said impeller wheel, first and second planetary gear trains interposed between said converter unit and said output shaft, drive transmitting means connecting said turbine wheel to the annulus gear of said first planetary gear train and to the sun gear of said second planetary gear train, drive transmitting means connecting the planet carrier of said first planetary gear train and the annulus gear of said second planetary gear train to said output shaft, braking means adapted to anchor the sun gear of said first planetary gear train against rotation so as to provide means for transmitting a combination hydraulic and mechanical, low speed underdrive to said output shaft, braking means adapted to anchor the planet carrier of said second planetary gear train against rotation so as to provide means for transmitting a reverse drive to said output shaft, a first clutch means adapted to connect said input and output shafts for the transmission of direct drive, a second clutch means adapted to drivingly connect said input shaft to the annulus gear of said first planetary gear train so as to lock said converter unit out of said low speed underdrive train and provide means for the transmission of a completely mechanical, high speed, underdrive to said output shaft, control means adapted to effect automatic upshifting from said low speed underdrive to said high speed underdrive to said direct drive and automatic downshifting from said direct drive to said high speed underdrive to said low speed underdrive.

16. In a power transmission, an input shaft, an output shaft, a hydraulic torque converter unit comprising operatively associated impeller, turbine and reaction wheels, means providing a driving connection between said input shaft and said impeller wheel, first and second planetary gear trains interposed between said converter unit and said output shaft, drive transmitting means connecting said turbine wheel to the annulus gear of said first planetary gear train and to the sun gear of said second planetary gear train, drive transmitting means connecting the planet carrier of said first planetary gear train and the annulus gear of said second planetary gear train to said output shaft, braking means adapted to anchor the sun gear of said first planetary gear train against rotation so as to provide means for transmitting a combination hydraulic and mechanical, low speed underdrive to said output shaft, braking means adapted to anchor the planet carrier of said second planetary gear train against rotation so as to provide means for transmitting a reverse drive to said output shaft, a first clutch means adapted to connect said input and output shafts for the transmission of direct drive, a second clutch means adapted to drivingly connect said input shaft to the annulus gear of said first planetary gear train so as to lock said converter unit out of said low speed underdrive train and provide means for the transmission of a completely mechanical, high speed, underdrive to said output shaft, control means adapted to effect automatic upshifting from said low speed underdrive to said high speed underdrive to said direct drive and automatic downshifting from said direct drive to said high speed underdrive to said low speed underdrive, and manually actuated means adapted to kickdown said direct drive to said positive high speed underdrive.

17. In a power transmission, an input shaft, an output shaft, a hydraulic torque converter unit comprising operatively associated impeller, turbine and reaction wheels, means providing a driving connection between said input shaft and said impeller wheel, first and second planetary gear trains interposed between said converter unit and said output shaft, drive transmitting means connecting said turbine wheel to the annulus gear of said first planetary gear train, means drivingly connecting said input shaft to the sun gear of said second planetary gear train, means connecting the planet carriers of said first and second planetary gear trains to said output shaft, braking means adapted to anchor the sun gear of said first planetary gear train against rotation so as to provide means for transmitting a combination hydraulic and mechanical torque multiplying underdrive to said output shaft, braking means adapted to anchor the annulus gear of said second planetary gear train against rotation so as to provide means for transmitting a positive, completely mechanical low gear underdrive to said output shaft, a first clutch means adapted to connect said input and output shafts for the transmission of direct drive, a second clutch means adapted to drivingly connect said input shaft to the annulus gear of said first planetary gear train so as to provide a drive train for the transmission of a second positive, completely mechanical, underdrive.

18. In a power transmission, an input shaft, an output shaft, a hydraulic torque converter unit comprising operatively associated impeller, turbine and reaction wheels, means providing a driving connection between said input shaft and said impeller wheel, first, second and third planetary gear trains interposed between said converter unit and said output shaft, means connecting said turbine wheel to the annulus gear of said first planetary gear train and to the sun gear of said second planetary gear train, means connecting said input shaft to the sun gear of said third planetary gear train, means connecting the planet carriers of said first and third planetary gear trains and the annulus gear of said second planetary gear train to said output shaft, braking means adapted to anchor the sun gear of said first planetary gear train against rotation so as to provide means for transmitting a low speed underdrive to said output shaft, braking means adapted to anchor the planet carrier of said second planetary gear train against rotation so as to provide means for transmitting a reverse drive to said output shaft, braking means adapted to anchor the annulus gear of said third planetary gear train against rotation so as to provide means for transmitting a positive, low gear ratio, underdrive to said output shaft, a first clutch means adapted to connect said input and output shafts for the transmission of direct drive, a second clutch means adapted to drivingly connect said input shaft to the annulus gear of said first planetary gear train so as to provide a drive train for the transmission of a positive, high speed, underdrive.

19. In a power transmission, an input shaft, an output shaft, a hydraulic torque converter unit comprising impeller, turbine and reaction wheels operatively associated for the transmission of torque, means providing a drive transmitting connection between said input shaft and said impeller wheel, a planetary gear train, comprising operatively associated sun, annulus and planet gears and a planet gear carrier interposed between said converter unit and said output shaft and adapted to be drivingly connected therebetween, driving transmitting means connecting said turbine wheel to the annulus gear of said planetary gear train, drive transmitting means connecting the planet gear carrier of said planetary gear train to said output shaft, braking means adapted to lock the sun gear of said planetary gear train against rotation so as to activate said gear train and provide drive transmitting means particularly adapted for transmitting a low speed, high torque multiplication underdrive to said output shaft, a first clutch means mounted between said input and output shafts and adapted to be engaged to connect said shafts so as to provide means for the transmission of direct drive between said shafts, a second clutch means associated with said converter unit and adapted to be engaged to directly connect said converter impeller and turbine wheels so as to provide an input to said gear train that by-passes the converter unit and directly connects said input shaft to the annulus gear of said planetary gear train to thereby provide a drive train particularly adapted for transmitting a positive high speed underdrive to said output shaft.

20. In a hydrodynamic transmission, a driving shaft, a driven shaft, a hydraulic torque converter unit comprising operatively associated impeller, turbine and reaction members interposed between said shafts, drive transmitting means connecting said driving shaft and said impeller member, planetary gear means interposed between and adapted to be drivingly connected to said shafts comprising a first planetary gear train mounted on said driving shaft and adapted to be drivingly connected between said turbine member and said driven shaft to provide means for the transmission of a combination hydraulic and mechanical, torque multiplying underdrive to said driven shaft, a second planetary gear train mounted on said driving shaft and adapted to be drivingly connected between said turbine member and said driven shaft to provide means for the transmission of a reverse drive to said driven shaft, a third planetary gear train mounted on said driving shaft and adapted to be drivingly connected between said driving and driven shafts to provide means for the transmission of a positive, low gear ratio underdrive to said driven shaft, clutch means carried by said shafts adapted to be engaged to provide means for the transmission of a positive direct drive between said shafts, and braking means to selectively activate said gear trains, said braking means being arranged to be selectively applied to either of said first or second planetary gear trains during the transmission of said positive underdrive through said third gear train whereby the relative rotative speeds of said converter turbine and impeller members are varied so as to provide a turbo-brake to said positive underdrive.

21. In a hydrodynamic transmission, a driving shaft, a driven shaft, a hydraulic torque converter unit comprising operatively associated impeller, turbine and reaction wheels, means drivably connecting said driving shaft to said impeller wheel, planetary gear means interposed between and adapted to be activated to drivingly connect said shafts comprising a first planetary gear train mounted on said driving shaft and adapted to be drivingly connected between said turbine member and said output shaft to provide means for the transmission of a converter transmitted, torque multiplying underdrive to said driven shaft, a second planetary gear train mounted on said driving shaft and adapted to be drivingly connected between said shafts to provide means for the transmission of a positive, low gear ratio underdrive to said driven shaft, and braking means to selectively activate said gear trains, said braking means being adapted to be applied to said first gear train, when said positive, low gear ratio underdrive is being transmitted by said second gear train, to activate said first gear train and vary the relative rotative speeds of said converter turbine and impeller members so as to provide a turbo-braking means for said positive underdrive.

22. In a hydrodynamic transmission, a driving shaft, a driven shaft, a hydraulic torque converter unit comprising operatively associated impeller, turbine and reaction wheels, means drivably connecting said driving shaft to said impeller wheel, planetary gear means interposed between and adapted to be drivingly connected to said shafts comprising a first planetary gear train mounted on said driving shaft and adapted to be drivingly connected between said turbine member and said output shaft to provide means for the transmission of a reverse drive to said driven shaft, a second planetary gear train mounted on said driving shaft and adapted to be drivingly connected between said shafts to provide means for the transmission of a positive, low gear ratio, forward underdrive to said driven shaft, and braking means to selectively activate said gear trains, said braking means being adapted to be applied to said first planetary gear train, when said positive underdrive is being transmitted by said second gear train, to activate said first planetary gear train and vary the rotative speed of said turbine member with respect to the speed of said impeller member so as to provide a turbo-braking means for said positive underdrive.

23. A planetary type transmission mechanism adapted to be selectively driven by the driving and driven members of a hydraulic torque transmitting unit comprising a first shaft connected to the said driven member, a second shaft, concentrically arranged with respect to said first shaft, connected to the said driving member, and an output shaft, a first, a second and a third planetary gear train interposed between said first and second shafts and said output shaft, said gear trains each comprising meshingly engaged sun, annulus and planet pinion gears and each including a carrier for rotatably supporting the pinion gears thereof, said first shaft mounting the sun gear of the first planetary gear train and the annulus gear of the second planetary train, said second shaft mounting the sun gear of the third planetary gear train, means drivingly connecting the annulus gear of said first planetary gear train to said output shaft, means drivingly connecting the planet carriers of said second and third planetary gear trains to said output shaft, brake means adapted to be applied to the planet carrier of said first planetary gear train to activate said first train and provide means for transmitting a reverse drive from said first shaft to said output shaft, brake means adapted to be applied to the sun gear of said second planetary gear train to activate said second train and provide means for transmitting a first forward, low speed, underdrive from said second shaft to said output shaft, brake means adapted to be applied to the annulus gear of said third planetary gear train to activate said third train and provide means for transmitting a second, forward, low speed, underdrive from said second shaft to said output shaft, and clutch means adapted to drivingly connect said second shaft and said output shaft to provide means for the transmission of a positive direct drive therebetween.

24. A planetary type transmission mechanism adapted to be selectively driven by the driving and driven members of a hydraulic torque transmitting unit comprising a first shaft connected to the said driven member, a second shaft connected to the said driving member, and an output shaft, a first, a second and a third planetary gear train interposed between said first and second shafts and said output shaft, said gear trains each comprising meshingly engaged sun, annulus and planet pinion gears and including a carrier for rotatably supporting the pinion gears, said first shaft mounting the sun gear of the first planetary gear train and the annulus gear of the second planetary train, said second shaft mounting the sun gear of the third planetary gear train, means drivingly connecting the annulus gear of said first planetary gear train to said output shaft, means drivingly connecting the planet carriers of said second and third planetary gear trains to said output shaft, brake means adapted to be applied to the planet carrier of said first planetary gear train to activate said first train and provide means for transmitting a reverse drive from said first shaft to said output shaft, brake means adapted to be applied to the sun gear of said second planetary gear train to activate said second train and provide means for transmitting a forward low speed underdrive from said first shaft to said output shaft, brake means adapted to be applied to the annulus gear of said third planetary gear train to activate said third train and provide means for transmitting a forward underdrive from said second shaft to said output shaft, clutch means adapted to drivingly connect said second shaft and said output shaft to provide means for the transmission of direct drive therebetween, and clutch means adapted to be connected between said second shaft and the annulus gear of the second planetary gear train to provide means for the transmission of a positive, forward, high speed underdrive between said second shaft and said output shaft.

25. A planetary type transmission mechanism adapted to be selectively driven by the driving and driven members of a hydraulic torque transmitting unit comprising a first shaft connected to the said driven member, a second shaft connected to the said driving member, and an output shaft, a first and second planetary gear train interposed between said first and second shafts and said output shaft, said gear trains each comprising meshingly engaged sun, annulus and planet pinion gears and including a carrier for rotatably supporting the pinion gears, said first shaft mounting the sun gear of the first planetary gear train and the annulus gear of the second planetary train, means drivingly connecting the annulus gear of said first planetary gear train to said output shaft, means drivingly connecting the planet carrier of said second gear train to said output shaft, brake means adapted to be applied to the planet carrier of said first planetary gear train to activate said first train and provide means for transmitting a reverse drive from said first shaft to said output shaft, brake means adapted to be applied to the sun gear of said second planetary gear train to activate said second train and provide means for transmitting a forward low speed underdrive from said first shaft to said output shaft, clutch means adapted to drivingly connect said second shaft and said output shaft to provide means for the transmission of direct drive therebetween, and clutch means adapted to be connected between said second shaft and the annulus gear of the second planetary gear train to provide means for the transmission of a positive, forward, high speed underdrive between said second shaft and said output shaft.

26. A planetary type transmission mechanism adapted to be selectively driven by the driving and driven members of a hydraulic torque transmitting unit comprising a first shaft connected to the said driven member, a second shaft connected to the said driving member, and an output shaft, a first, a second and a third planetary gear train interposed between said first and second shafts and said output shaft, said gear trains each comprising meshingly engaged sun, annulus and planet pinion gears and including a carrier for rotatably supporting the pinion gears, said first shaft mounting the sun gear of the first planetary gear train and the annulus gear of the second planetary train, said second shaft mounting the sun gear of the third planetary gear train, means drivingly connecting the annulus gear of said first planetary gear train to said output shaft, means drivingly connecting the planet carriers of said second and third planetary gear trains to said output shaft, brake means adapted to be applied to the planet carrier of said first planetary gear train to activate said first train and provide means for transmitting a reverse drive from said first shaft to said output shaft, brake means adapted to be applied to the sun gear of said second planetary gear train to activate said second train and provide means for transmitting a forward low speed underdrive from said first shaft to said output shaft, brake means adapted to be applied to the annulus gear of said third planetary gear train to activate said third train and provide means for transmitting a forward underdrive from said second shaft to said output shaft, clutch means adapted to drivingly connect said second shaft and said output shaft to provide means for the transmission of direct drive therebetween, and clutch means adapted to be connected between said second shaft and the annulus gear of the second planetary gear train to provide means for the transmission of a positive, forward, high speed underdrive between said second shaft and said output shaft, speed and torque responsive means to independently operate the several clutch means and speed responsive means to effect automatic operation of the brake means for the second and third gear trains to provide a means for converting the positive underdrive into the low speed underdrive when the output shaft speed is reduced to a predetermined value.

27. In a hydrodynamic transmission, a driving shaft, a driven shaft, a hydraulic torque converter unit comprising operatively associated impeller, turbine and reaction members interposed between said shafts, drive transmitting means connecting said driving shaft and said impeller member, planetary gear means interposed between and adapted to be drivingly connected to said shafts comprising a first planetary gear train mounted on said driving shaft having certain elements thereof arranged to be drivingly connected between said turbine member and said driven shaft to provide means for the transmission of a combination hydraulic and mechanical, torque multiplying underdrive to said driven shaft, a second planetary gear train mounted on said driving shaft having certain elements thereof arranged to be drivingly connected between said turbine member and said driven shaft to provide means for the transmission of a reverse drive to said driven shaft, a third planetary gear train mounted on said driving shaft having certain elements thereof arranged to be drivingly connected between said driving and driven shafts to provide means for the transmission of a positive, low gear ratio, underdrive to said driven shaft, clutch means carried by said shafts adapted to be engaged to provide means for the transmission of a positive direct drive between said shafts, and braking means to selectively activate said gear trains, said braking means being arranged and adapted to be applied to other elements of said first planetary gear train during the engagement of said clutch means and the transmission of the positive direct drive, whereby the relative rotative speeds of said converter turbine and impeller members can be varied so as to provide a turbo braking action on said positive direct drive.

28. In a hydrodynamic transmission, a driving shaft, a driven shaft, a hydraulic torque converter unit comprising operatively associated impeller, turbine and reaction members interposed between said shafts, drive transmitting means connecting said driving shaft and said impeller member, planetary gear means interposed between and adapted to be drivingly connected to said shafts comprising a first planetary gear train mounted on said driving shaft having certain elements thereof arranged to be drivingly connected between said turbine member and said driving shaft to provide means for the transmission of a combination hydraulic and mechanical, torque multiplying underdrive to said driven shaft, a second planetary gear train mounted on said driven shaft having certain elements thereof arranged to be drivingly connected between said turbine member and said driven shaft to provide means for the transmission of a reverse drive to said driven shaft, a third planetary gear train mounted on said driving shaft having certain elements thereof arranged to be drivingly connected between said driving and driven shafts to provide means for the transmission of a positive, low gear ratio, underdrive to said driven shaft, clutch means carried by said shafts adapted to be engaged to provide means for the transmission of a positive direct drive between said shafts, and braking means to selectively activate said gear trains, said braking means being arranged and adapted to be applied to other elements of said second planetary gear train during the engagement of said clutch means and the transmission of the positive direct drive, whereby the relative rotative speeds of said converter turbine and impeller members can be varied so as to provide a turbo braking action on said positive direct drive.

29. In a hydrodynamic transmission, a driving shaft, a driven shaft, a hydraulic torque converter unit comprising operatively associated impeller, turbine and reaction members interposed between said shafts, drive transmitting means connecting said driving shaft and said impeller member, planetary gear means interposed between and adapted to be drivingly connected to said shafts comprising a first planetary gear train mounted on said driving shaft having certain elements thereof arranged to be drivingly connected between said turbine member and said driven shaft to provide means for the transmission of a combination hydraulic and mechanical, torque multiplying underdrive to said driven shaft, a second planetary gear train mounted on said driving shaft having certain elements thereof arranged to be drivingly connected between said turbine member and said driven shaft to provide means for the transmission of a reverse drive to said driven shaft, a third planetary gear train mounted on said driving shaft having certain elements thereof arranged to be drivingly connected between said driving and driven shafts to provide means for the transmission of a positive, low gear ratio, underdrive to said driven shaft, and braking means to selectively activate said gear trains, said braking means being arranged and adapted to be selectively applied to other elements of said first planetary gear train during the transmission of said positive underdrive through said third gear train whereby the relative rotative speeds of said converter turbine and impeller members can be varied so as to provide a turbo-brake to said positive underdrive.

30. In a hydrodynamic transmission, a driving shaft, a driven shaft, a hydraulic torque converter unit comprising operatively associated impeller, turbine and reaction members interposed between said shafts, drive transmitting means connecting said driving shaft and said impeller member, planetary gear means interposed between and adapted to be drivingly connected to said shafts comprising a first planetary gear train mounted on said driving shaft having certain elements thereof arranged to be drivingly connected between said turbine member and said driven shaft to provide means for the transmission of a combination hydraulic and mechanical, torque multiplying underdrive to said driven shaft, a second planetary gear train mounted on said driving shaft having certain elements thereof arranged to be drivingly connected between said turbine member and said driven shaft to provide means for the transmission of a reverse drive to said driven shaft, a third planetary gear train mounted on said driving shaft having certain elements thereof arranged to be drivingly connected between said driving and driven shafts to provide means for the transmission of a positive, low gear ratio, underdrive to said driven shaft, and braking means to selectively activate said gear trains, said braking means being arranged and adapted to be selectively applied to other elements of said second planetary gear train during the transmission of said positive underdrive through said third gear train whereby the relative rotative speeds of said converter turbine and impeller members can be varied so as to provide a turbo-brake to said positive underdrive.

31. In a hydrodynamic transmission, a driving shaft, a driven shaft, a hydraulic torque converter unit comprising operatively associated impeller, turbine and reaction wheels, means drivably connecting said driving shaft to said impeller wheel, planetary gear means interposed between and adapted to be activated to drivingly connect said shafts comprising a first planetary gear train mounted on said driving shaft having certain elements thereof arranged to be drivingly connected between said turbine member and said output shaft to provide means for the transmission of a converter transmitted, torque multiplying, underdrive to said driven shaft, a second planetary gear train mounted on said driving shaft having certain elements thereof arranged to be drivingly connected between said shafts to provide means for the transmission of a positive, low gear ratio, underdrive to said driven shaft, and braking means selectively applicable to other elements thereof the several gear trains to activate the individual gear trains for the transmission of drive between said shafts, a drive ratio selector means, and output shaft speed responsive means to control the activation and deactivation of the several gear trains irrespective of the drive ratio selector means.

32. In a hydrodynamic transmission, a driving shaft, a driven shaft, a hydraulic torque converter unit comprising operatively associated impeller, turbine and reaction wheels, means drivably connecting said driving shaft to said impeller wheel, planetary gear means interposed between and adapted to be activated to drivingly connect said shafts comprising a first planetary gear train mounted on said driving shaft having certain elements thereof arranged to be drivingly connected between said turbine member and said output shaft to provide means for the transmission of a converter transmitted, torque multiplying, underdrive to said driven shaft, a second planetary gear train mounted on said driving shaft having certain elements thereof arranged to be drivingly connected between said shafts to provide means for the transmission of a positive, low gear ratio, underdrive to said driven shaft, and braking means selectively applicable to other elements of the several gear trains to activate the individual gear trains for the transmission of drive between said shafts, a drive ratio selector means, and output shaft speed responsive means to initiate all drive through the converter transmitted underdrive when the drive ratio selector means has been set to activate the positive, low gear ratio, underdrive and to thereafter automatically transfer the drive train to the positive underdrive gear train when the output shaft has attained a predetermined speed.

33. A planetary type transmission mechanism adapted to be selectively driven by the impeller and turbine members of a hydraulic torque converter unit comprising a first shaft adapted to be drivingly connnected to said turbine, a second shaft adapted to be drivingly connected to said impeller, and an output shaft, said first shaft mounting the sun gear of a first planetary gear train and the annulus gear of a second planetary train, said second shaft mounting the sun gear of a third planetary gear train, means connecting the annulus gear of said first planetary gear train to said output shaft, means connecting the planet carriers of said second and third planetary gear trains to said output shaft, brake means adapted to be applied to the planet carrier of said first planetary gear train to activate said first train and provide means for transmitting a reverse drive from said first shaft to said output shaft, brake means adapted to be applied to the sun gear of said second planetary gear train to activate said second train and provide means for transmitting a forward underdrive from said first shaft to said output shaft, brake means adapted to be applied to the annulus gear of said third planetary gear train to activate said third train and provide means for transmitting a forward underdrive from said second shaft to said output shaft, a first clutch means adapted to drivingly connect said second shaft and said output shaft to provide means for the transmission of direct drive between said clutch connected shafts, and a second clutch means adapted to drivingly connect said second shaft to the annulus gear of said second planetary gear train to provide means for the transmission of a positive high speed underdrive.

JOSEPH JANDASEK.

REFERENCES CITED

The following references are of record in the file of this patent:

UNITED STATES PATENTS

| Number | Name | Date |
|---|---|---|
| 1,132,390 | Royce | Mar. 16, 1915 |
| 2,146,369 | Dodge | Feb. 7, 1939 |
| 2,322,479 | Schjolin | June 22, 1943 |
| 2,456,328 | Schneider | Dec. 14, 1948 |